US008472685B2

(12) United States Patent
Chien et al.

(10) Patent No.: US 8,472,685 B2
(45) Date of Patent: Jun. 25, 2013

(54) APPARATUS AND METHOD FOR SURFACE CAPTURING AND VOLUMETRIC ANALYSIS OF MULTIDIMENSIONAL IMAGES

(75) Inventors: Aichi Chien, Los Angeles, CA (US); Bin Dong, La Jolla, CA (US); Yu Mao, Minneapolis, MN (US); Stanley J. Osher, Pacific Palisades, CA (US)

(73) Assignee: The Regents of the University of California, Oakland, CA (US)

( * ) Notice: Subject to any disclaimer, the term of this patent is extended or adjusted under 35 U.S.C. 154(b) by 502 days.

(21) Appl. No.: 12/854,860

(22) Filed: Aug. 11, 2010

(65) Prior Publication Data

US 2011/0064286 A1 Mar. 17, 2011

Related U.S. Application Data

(60) Provisional application No. 61/233,194, filed on Aug. 12, 2009.

(51) Int. Cl.
*G06K 9/00* (2006.01)
(52) U.S. Cl.
USPC .......................................................... 382/128
(58) Field of Classification Search
USPC .................................................. 382/128–132
See application file for complete search history.

(56) References Cited

U.S. PATENT DOCUMENTS

| 6,718,054 | B1* | 4/2004 | Lorigo et al. ................. 382/128 |
| 7,519,209 | B2* | 4/2009 | Dawant et al. ................ 382/128 |
| 8,155,405 | B2* | 4/2012 | Unal et al. .................... 382/128 |
| 8,175,348 | B2* | 5/2012 | Van Uitert et al. ............ 382/128 |
| 2009/0080738 | A1 | 3/2009 | Zur et al. |
| 2009/0097727 | A1 | 4/2009 | Jolly et al. |

FOREIGN PATENT DOCUMENTS

WO 2009126951 A3 10/2009

OTHER PUBLICATIONS

Peng, D. et al.—"A PDE-Based Fast Local Level Set Method"—Jour. of Computational Physics, vol. 155, 1999, pp. 410-438.
Zhao, H. et al.—"A Variational Level Set Approach to Multiphase Motion"—Jour. of Computational Physics, vol. 127, 1996, pp. 179-195.
Sarti, A. et al.—"Subjective Surfaces: A Geometric Model for Boundary Completion"—Int. Jour. of Computer Vision, vol. 46, No. 3, 2002, pp. 1-36.
Geiger, D. et al.—"Salient and Multiple Illusory Surfaces"—IEEE Comp. Soc. Conf. of Computer Vision and Pattern Recognition, Jun. 1998, Santa Barbara, CA, pp. 118-124.
Wiebers, D.O. et al.—"Unruptured Intracranial Aneurysms—Risk of Rupture and Risks of Surgical Intervention"—New England Jour. of Medicine, vol. 339, No. 24, Dec. 10, 1998, pp. 1725-1733.
Dong, B. et al.—"Level Set Based Brain Aneurysm Capturing in 3D"—Inverse Problems and Imaging, vol. 4, No. 2, 2010, pp. 241-255.

(Continued)

*Primary Examiner* — Gerald J. O'Connor
*Assistant Examiner* — Jonathan K Ng
(74) *Attorney, Agent, or Firm* — John P. O'Banion

(57) ABSTRACT

A method and apparatus for volumetric image analysis and processing is described. Using the method and apparatus, it is possible to obtain geometrical information from multi-dimensional (3D or more) images. As long as an object can be reconstructed as a 3D object, regardless of the source of the images, the method and apparatus can be used to segment the target (in 3D) from the rest of the structure and to obtain the target's geometric information, such as volume and curvature.

20 Claims, 6 Drawing Sheets

OTHER PUBLICATIONS

Kassell, N.F. et al.—"Aneurysmal Rebleeding: A Preliminary Report from the Cooperative Aneurysm Study"—Neurosurgery, vol. 13, No. 5, 1983, pp. 479-481.

Raghavan, M.L. et al.—"Quantified aneurysm shape and rupture risk"—Jour. Neurosurg, vol. 104, 2005, pp. 355-362.

Zhu, W. et al.—"Capture Illusory Contours: A Level Set Based Approach"—UCLA CAM Report 03-65, 2003, pp. 1-13.

Yim, P.J. et al.—"Vessel Surface Reconstruction With a Tubular Deformable Model"—IEEE Trans. on Medical Imaging, vol. 20, No. 12, Dec. 2001, pp. 1411-1421.

Chen, J. et al.—"Quantifying 3-D Vascular Structures in MRA Images using Hybrid PDE and Geometric Deformable Models"—IEEE Trans. on Medical Imaging, vol. 23, No. 10, Oct. 2004, pp. 1251-1262.

Dong, B. et al.—"Level Set Based Nonlocal Surface Restoration"—Multiscale Modeling & Simulation, vol. 7, No. 2, pp. 1-10.

Tsai, Y.R. et al.—"Fast Sweeping Algorithms for a Class of Hamilton-Jacobi Equations"—SIAM Jour. on Numerical Analysis, vol. 41, No. 2, 2004, pp. 673-694.

Goldman, R.—"Curvature formulas for implicit curves and surfaces"—Computer Aided Geometric Design, vol. 22, 2005, pp. 632-658.

Zhu, W. et al.—"Segmentation with Depth: A Level Set Approach"—SAIM Jour. Sci. Comput., vol. 28, No. 5, pp. 1957-1973.

Sarti, A. et al.—"Subjective Surfaces and Riemannian Mean Curvature Flow of Graphs"—Proc. of Algoritmy 2000, vol. LXX, No. 1, 2001, pp. 85-103.

Zhu, W. et al.—"A Variational Model for Capturing Illusory Contours Using Curvature"—J. Math Imaging Vis., vol. 27, 2007, pp. 29-40.

Chan, T.—"Level Set Based Shape Prior Segmentation"—IEEE Computer Society Conf. of Comput. Vision and Pattern Recognition, Jun. 20-26, 2005, San Diego, CA, pp. 1-7.

* cited by examiner

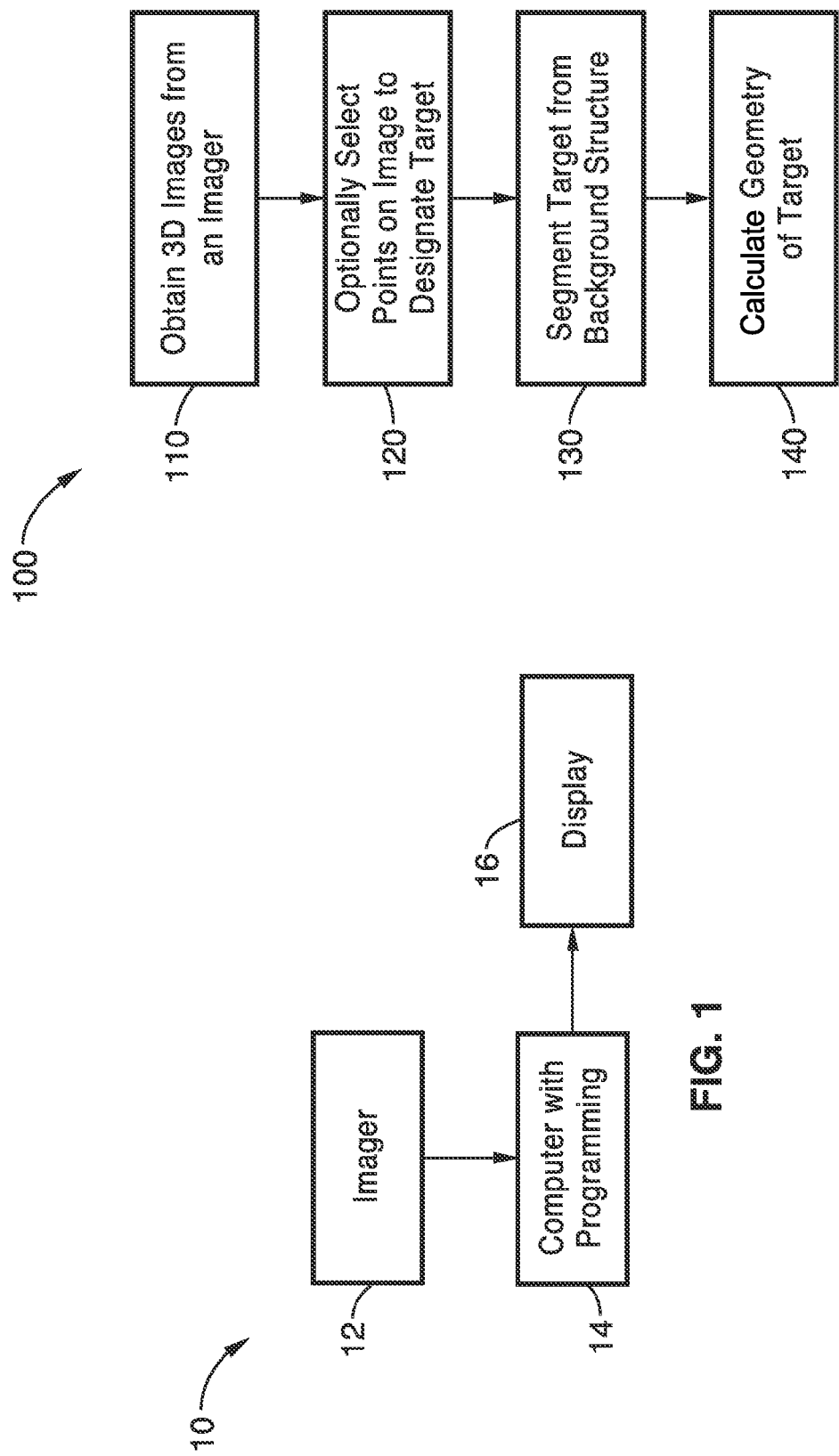

APPARATUS AND METHOD FOR SURFACE CAPTURING AND VOLUMETRIC ANALYSIS OF MULTIDIMENSIONAL IMAGES

CROSS-REFERENCE TO RELATED APPLICATIONS

This application claims priority from U.S. provisional application Ser. No. 61/233,194 filed on Aug. 12, 2009, incorporated herein by reference in its entirety.

STATEMENT REGARDING FEDERALLY SPONSORED RESEARCH OR DEVELOPMENT

This invention was made with Government support under NIH Grant Number P20 MH65166 and NSF Grant Number DMS-0714807. The Government has certain rights in the invention.

INCORPORATION-BY-REFERENCE OF MATERIAL SUBMITTED ON A COMPACT DISC

Not Applicable

BACKGROUND OF THE INVENTION

1. Field of the Invention

This invention pertains generally to devices and methods for two dimensional and three dimensional imaging, and more particularly to devices and methods for quickly and accurately segmenting a target in a three dimensional image from the rest of the structure and to obtain the target's geometric information, such as volume and surface curvature.

2. Description of Related Art

The information acquired from the diagnostic imaging of the body of a patient is an essential part of the treatment plan of modern physicians. The identification of the location and the geometry of structural injuries or defects assist medical evaluations and surgical planning. For example, diagnostic imaging is vital to the clinical evaluation of the geometry of aneurysms, tumors, thromboses, inflammations, foreign objects, organs and other objects which can be identified in 3D images for treatment. Imaging is used to document the disease and to estimate the area which will be surgically removed or to estimate the area which needs surgical filling such as cosmetic surgical implants.

For example, computed tomography (CT) is a medical imaging procedure which is performed millions of times each year in the United States. CT scans allow physicians to look at images of the anatomy of the patient in individual "slices" or "sections". A modern CT scanner can produce thousands of two dimensional images of a patient's body in areas that are difficult to diagnose like the head, thorax, abdomen, or pelvis.

Volumetric analysis from images is becoming increasingly important as imaging technology advances. Various imaging technologies such as magnetic resonance imaging (MRI), ultrasound, CT, and satellite images have been improved from 2D to 3D and 4D (3D+time).

Currently, methods that are capable of evaluating a 3D volume are very limited. A method to evaluate the volume from volumetric images in a timely fashion such as for use in medical clinical evaluation is not available. Existing technologies include (1) manually segmenting the target from either 2D image or 3D mesh followed by a mesh calculation to estimate the volume, and (2) deforming a sphere or ellipse shape to fill the target, and then using the volume of the sphere/ellipse to represent the volume of the target. Both of these methods are labor intensive and time consuming, and cannot produce accurate results for irregularly shaped objects.

There exists an immediate need to quantitatively document the geometry of objects and anatomical structures to assist with medical clinical evaluations. There is a need to quickly compute the geometry of aneurysms, tumors, thromboses, inflammations, foreign objects, organs and other structures which can be identified in images and reconstructed into 3D objects, with little human intervention.

Other medical applications in addition to clinical evaluation are also in need of tools for virtual surgery or surgical planning including an estimation of the volume of tissue that will be surgically removed or the volume needed for surgical implants or for research tools to quantitatively obtain the 3D geometry and volume of targets of interest such as individual cells or cell compartments.

The present invention satisfies these needs, as well as others, by providing an apparatus and method to quickly and accurately obtain geometrical information, such as curvature or volume of an object from multi-dimensional (3D or more) images. It can also be used as a semi-automatic segmentation method which separates an irregular shaped 3D target from the rest of the surrounding structure for imaging and analysis.

BRIEF SUMMARY OF THE INVENTION

The present invention pertains to methods and systems that use medical images that can come from a variety of sources to segment and calculate the volume and geometry of irregular 3D objects with minimal human interaction. Moreover, with knowledge of the volume and geometry, various physical parameters can also be derived accurately such as mass. It is also useful for planning and estimating the medical outcome (e.g. surgical planning, estimating surgical inserts). This invention can use any type of image as input and it is particularly useful in medical applications.

The general method of obtaining geometrical information from irregular, 3D structures of the invention can be used for analysis of geological images, such as calculation of underground volumes of lava or oil. The method can be used for the segmentation and computation of geometry and volume from microscopic images to analyze 3D objects, such as individual cells or other related structures. The quantification of other objects with irregular shapes such as fire or smoke, or analysis of images captured by satellites or extracting regions from general surfaces used for computer graphics can also be accomplished with the methods of the present invention.

The application of the method to medical images is presented to illustrate the accuracy, consistency and robustness of the method in capturing medical conditions such as brain aneurysms and volume quantification. The existing practice in medical images is to determine the three dimensional (3D) geometry of a target by measuring the distance between two points or using sphere or ellipse shapes to estimate the volume (e.g. the volume of human left ventricle). Complicated shapes, such as the volume of the human right ventricle, usually cannot be quantified through images. Manual methods of segmentations have been attempted in research. However, those methods are time consuming and labor intensive, and as a result unsuitable for practical usages.

The method may include only a small amount of human interaction (six points to indicate a target by a user), and it is fast and accurate. It takes about one minute of computational time using a laptop computer to calculate the geometry of a brain aneurysm, for example.

Starting from reconstructed volumetric images, the method first transfers the volumetric information into level set functions. With initial points chosen by user to indicate the target, the algorithm (modified illusory surface algorithm) can capture the target in three dimensions. The outcome can be visualized to see whether the calculated geometry agrees with the original images. Three or more parameters can be adjusted for different targets to obtain the optimal geometry calculation.

Advancements in neuro-imaging technology have helped medical conditions such as aneurysms to be found more often prior to rupture or other complication. Subarachnoid hemorrhage, primarily from ruptured brain aneurysms, accounts for 5% to 10% of all stroke cases and has a high fatality rate, for example. It has been shown that the risk of rupture greatly increases as the aneurysm increases in size. The current method used to determine the size of an aneurysm is to manually measure the dimension of the aneurysm dome and the width of the aneurysm neck. Since aneurysms usually have complicated shapes, using just the size of the aneurysm dome and neck may not be accurate and may overlook important geometrical information. Since aneurysms are described by level set functions, volumes, curvatures and other geometric quantities of the aneurysm surface can easily be computed for medical studies with the present invention. Experiments and comparisons with models used for capturing illusory contours in 2D images were also performed and used as examples.

The preferred model of the present invention is grounded in the following energy function to capture illusory contours in 3D:

$$E(\phi) = \int_\Omega (d\delta(\phi)|\nabla\phi| + \alpha H(\psi)H(\phi) + \beta\delta(\phi)|\nabla\phi|)dx$$

where $\psi$ is a signed distance function obtained from a given image whose zero level set represents the boundaries of the objects in the image, and $d=|\psi|$ is the corresponding unsigned distance function. The symbol $\nabla$ is the gradient operator, $\delta(\phi)$ is the Dirac delta functional, and $H(\phi)$ is the Heaviside function. The energy term $\alpha H(\psi)$ acts as a barricade for $\phi$. It forces the evolving zero level set of $\phi$ to stay inside of that of $\psi$, and it is inactive when the zero level set of $\phi$ is already inside $\psi$. As a result, the parameter $\alpha$ is less important than $\beta$. This term therefore ensures that the model will capture only the inner contour rather than the outer one.

Since the function $\delta(\phi)$ in the corresponding gradient flow equations is concentrated only on the zero level set of $\phi$, the equation only describes a motion for the zero level set of $\phi$. Therefore, to ensure that all level sets of $\phi$ have similar motions on the entire 3D rectangular domain, the $\delta(\phi)$ value was replaced with $|\nabla\phi|$. However, it was observed that the dominant force $\nabla d$ did not distinguish between the relatively flat regions and the sharp tip on the aneurysm, for example. Therefore, an amplification factor $A(\psi)$ was introduced in order to handle problems with complicated geometry, for example the geometry of an extruded bleb.

With the inclusion of the amplification factor $A(\psi)$, the following modified illusory surface model is provided:

$$\frac{\partial\phi}{\partial t} = |\nabla\phi|\left(A(\psi)\nabla d \cdot \frac{\nabla\phi}{|\nabla\phi|} + d\nabla \cdot \frac{\nabla\phi}{|\nabla\phi|} - \alpha H(\psi) + \beta\nabla \cdot \frac{\nabla\phi}{|\nabla\phi|}\right),$$

$$A(\psi) = 1 + \mu\kappa^+(\psi)$$

where $\mu$ is a constant parameter and $\kappa^+(\psi)$ is the positive part of the Gaussian curvature of $\psi$. By using the Gaussian curvature, one can automatically distinguish between the target region (aneurysm) and the other structures (blood vessels), because both the aneurysm and the vessel regions have comparable values of mean curvatures, while only in the aneurysm region, especially sharp tips, is the Gaussian curvature found to be large.

An aspect of the invention is to provide a system and method that can segment and compute the geometry of aneurysms, tumors, thromboses, inflammations, foreign objects, organs and any other objects that can be identified in 3D images to document diseases and estimate the area that will be surgically removed.

Another aspect of the invention is to provide a system and method that will quickly calculate volume and geometry of irregular 3D objects with minimal human interaction and that can be automated.

A still further aspect of the invention is to provide a system and method that provides essentially real time information to users.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a diagram of a system for segmenting targets from surrounding structures and determining target geometry according to one embodiment of the invention.

FIG. 2 is a conceptual flow diagram of a method for segmenting targets and determining target geometry.

DETAILED DESCRIPTION OF THE INVENTION

Figure 3:
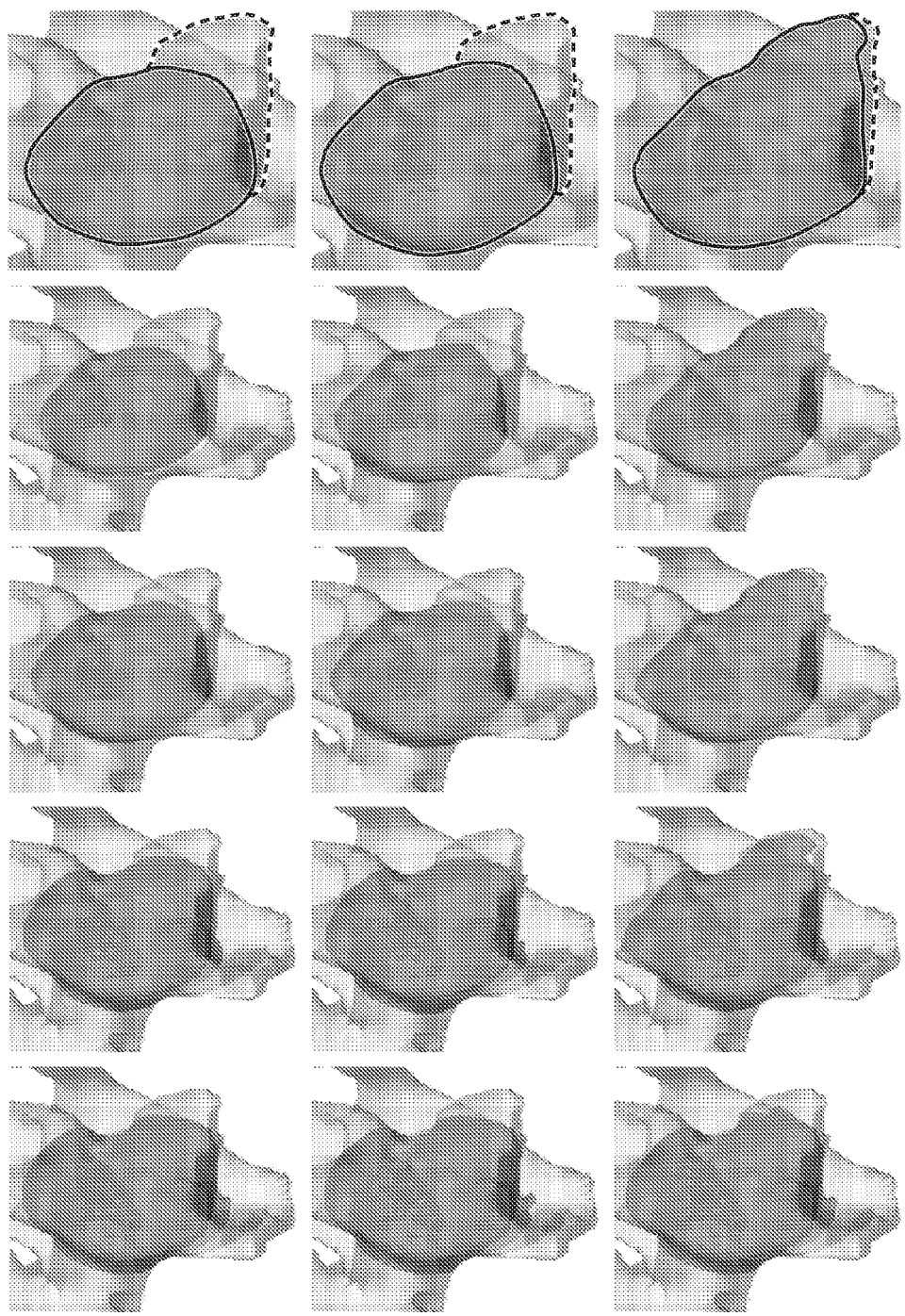
FIG. 3 is a comparison grid of aneurysm sequestrations using the prior art and the present invention that were acquired from the same set of brain images.

Referring more specifically to the drawings, for illustrative purposes the present invention is embodied in the system and methods generally shown in FIG. 1 through FIG. 5B and the associated devices used to perform the methods. It will be appreciated that the devices and systems may vary as to configuration and as to the details of the parts, and that the method may vary as to the specific steps and sequence, without departing from the basic concepts as disclosed herein.

The present invention relates to a system and method for quickly and accurately obtaining geometrical information of a target from three dimensional images. The method can also be used as a semi-automatic segmentation method that separates an irregular shaped 3D target from the rest of the surrounding structure.

Turning now to FIG. 1 and FIG. 2, the system 10 and one embodiment of the preferred method 100 are schematically shown. The system 10 includes one or more imagers 12 that provide many two-dimensional (2D) or three-dimensional (3D) images. As long as the object can be reconstructed as a 3D object, regardless of the source of the images, the present system and method can be used to segment the target (in 3D)

from the rest of the structures and obtain the target's geometric information, such as volume and curvature. Suitable sources of images include Magnetic Resonance Imaging (MRI), computed tomography (CT), ultrasound, satellite and digital photography.

The images that are obtained from the imager 12 are provided to a computer 14 with suitable software. The software of computer 14 may include programming for generating a three dimensional image from a series of two dimensional images from imager 12. The software of computer 14 may also include de-noising, thresholding, smoothing or other functions to improve the quality of the two-dimensional images and three-dimensional reconstructions prior to analysis. The software of computer 14 also includes programming for segmentation of target structures and identifying the geometry of the target and the results displayed. In the embodiment shown, the acquired reconstructed volumetric images and volumetric information are transferred into level set functions. With initial points (approximately six points optionally chosen by the user to indicate the target), the programming can capture the target in three dimensions. The outcome can be visualized on display 16 to see whether the calculated geometry agrees with the original images. Three or more parameters can be adjusted for different targets to obtain the optimal geometry calculation. In one embodiment, the captured image is placed over the original target to permit a visual verification of the contours. The display 16 can also display the calculated geometrical values. The images and can also be stored on storage devices associated with computer 16 or transmitted to other locations.

Referring now to FIG. 2, one embodiment of the method 100 for segmenting and calculating the geometry of a target that is encapsulated in the programming of computer 14 is generally shown. At block 110, the images or signals that are obtained from the imager are processed. The nature of the processing depends on the type of image that is presented. In one embodiment, the acquired images were de-noised before the 3D reconstruction. In another embodiment, the 3D images were reconstructed from 2D images first and then a surface smoothing algorithm was applied to obtain the 3D geometry. Other signal or image improving techniques may be applied to either the 2D images or the 3D reconstruction or both. For example, a simple thresholding method (with carefully chosen thresholds) followed by fast sweeping method and Gaussian smoothing to reconstruct the surface represented by a level set function, which takes positive values inside the vessel region and negative values outside was applied to the images shown in Example 1 and Example 2.

Once suitable 3D images have been obtained from imager, the area of interest or target is optionally identified by the user before initiating the computations in block 120. To obtain a reasonable initial target surface, a user interactive strategy is used to initiate the computation. In this embodiment, users select points around the area of interest and use the selected points to determine a sphere/ellipsoid with level set function $\phi_S$. Then $\phi(x, 0)$ is defined as the intersection of $\phi_S$ with $\psi$, or mathematically as $\phi(x, 0)=\min\{\phi_S(x), \psi(x)\}$. Although automated computation is desirable, determining a pathologic region is a medical diagnosis which needs an expert's supervision. Therefore, it is preferable to have the involvement of medical experts for target selection and the initiation of the computations.

At block 130 the selected target is segmented from the background structure. Segmentation is generally treated as an illusory surface capturing problem to capture and then calculate geometries of the target. The preferred model for segmentation is based on the following relationship:

$$\frac{\partial \phi}{\partial t} = |\nabla \phi|\left(A(\psi)\nabla d \cdot \frac{\nabla \phi}{|\nabla \phi|} + d\nabla \cdot \frac{\nabla \phi}{|\nabla \phi|} - \alpha H(\psi) + \beta \nabla \cdot \frac{\nabla \phi}{|\nabla \phi|}\right),$$

$$A(\psi) = 1 + \mu \kappa^+(\psi)$$

where $\mu$ is a constant parameter and $\kappa^+(\psi)$ is the positive part of the Gaussian curvature of $\psi$. The choice of the positive component (instead of some other choices such as the absolute value) of the Gaussian curvature is to ensure that the resulting surface does not contain any part of the vessels.

Indeed, assuming that the initial surface contains part of the blood vessels, and if the vessel locally looks like a cylinder, then its Gaussian curvatures are small, and the part of the surface on the vessel area will shrink and disappear eventually. Normally, vessels are curved instead of straight as cylinders. On the other hand, if the curved vessel is small in diameter, the mean curvature term $$\beta \nabla \cdot \frac{\nabla \phi}{|\nabla \phi|}$$

dominates $$A(\psi)\nabla d \cdot \frac{\nabla \phi}{|\nabla \phi|},$$

and the zero level set of $\phi$ in these regions also shrink.

It should also be noted that the model can be used for other types of surface capturing problems. The factor $A(\psi)$ will need to be fashioned according to the type of surface and the specific application.

Generally speaking, the following relationship is solved:

$$\phi_t + c_{a,b}(\phi)V_n(\phi)|\nabla \phi| = 0$$

with $V_n(\phi)$ the normal velocity depending on $\phi$ (e.g. $V_n = -\kappa$ for mean curvature motion), and the restriction function $c_{a,b}$ introduced to confine all effective calculations within a narrow band of zero level set of $\phi$. The restriction function $C_{a,b}$ is defined as:

$$c_{a,b}(x) = \begin{cases} 1, & \\ \frac{(|x|-b)^2(2|x|+b-3a)}{(b-a)^3}, & \text{where } |x| \leq a; \\ & a < |x| \leq b \text{ and } |x| > b. \\ 0, & \end{cases}$$

There are three parameters in the preferred model, $\mu$, $\alpha$ and $\beta$. The parameter $\mu$ controls the amount of force one wishes to apply near the regions with sharp features. The term $\alpha H(\psi)$ prevents the zero level set of $\phi$ from passing through that of $\psi$. Since the $\phi$ is initialized within $\psi$, this term only acts as a barricade and its value can be fixed. The parameter $\beta$ controls the global smoothness of $\phi$. The larger $\beta$ is, the smoother the final results that will be observed.

After the solution for $\phi$, which represents the target aneurysm, is obtained at block 130, at block 140 it is possible to calculate its volume using $V(\phi) = \int H(\phi)dx$. The mean curvature can be calculated by $$\kappa_m(\phi) = \nabla \cdot \frac{\nabla \phi}{|\nabla \phi|}$$

and the Gaussian curvature by $$\kappa_g(\phi) = \frac{\nabla \phi^T H(\phi) \nabla \phi}{|\nabla \phi|^4} \text{ where}$$

$$H(\phi) = \begin{pmatrix} \phi_{yy}\phi_{zz} - \phi_{yz}\phi_{zy} & \phi_{yz}\phi_{zx} - \phi_{yx}\phi_{zyz} & \phi_{yx}\phi_{zy} - \phi_{yy}\phi_{zx} \\ \phi_{xz}\phi_{zy} - \phi_{xy}\phi_{zz} & \phi_{xx}\phi_{zz} - \phi_{xz}\phi_{zx} & \phi_{xy}\phi_{zx} - \phi_{xx}\phi_{zy} \\ \phi_{xy}\phi_{yz} - \phi_{xz}\phi_{yy} & \phi_{yx}\phi_{xz} - \phi_{xx}\phi_{yz} & \phi_{xx}\phi_{yy} - \phi_{xy}\phi_{yx} \end{pmatrix}$$

and subscripts denote the partial derivatives in Cartesian coordinates.

In an alternative embodiment, the model can be modified to achieve the same goal. In this embodiment, the model at block 130 is modified. For example, the factor A(ψ) can be changed to some other factor that can enhance the force field ∇d at the regions with sharp features like a sharp tip. In addition, Gaussian curvature could be replaced by other curvatures or geometrical characteristics that can discriminate the regions of interest.

In another embodiment, the model at block 130 can also be written into the following more general form:

$$\frac{\partial \phi}{\partial t} = \vec{v}(\psi)|\nabla \phi| + r(\phi, \psi)|\nabla \phi|$$

where $\vec{v}(\psi)$ is the force field that pushes the zero level set of φ towards the regions of interests (specified by the zero level set of ψ), e.g.

$$A(\psi) \nabla d \cdot \frac{\nabla \phi}{|\nabla \phi|} - \alpha H(\psi)$$

as in the original model; and the function r(φ, ψ) controls the regularity of the zero level set of φ, e.g.

$$(d + \beta) \nabla \cdot \frac{\nabla \phi}{|\nabla \phi|}.$$

Different forms of $\vec{v}(\psi)$ and r(φ, ψ) can be chosen according to different types of surfaces and applications.

Accordingly, it is possible to accurately segment the target from the surrounding structure at block 130 and then to quantify the volume and other geometries at block 140. Moreover, with knowledge of volume and geometry, various physical parameters can be derived accurately such as mass, the density of objects or number of molecules. It is also useful for planning and estimating the outcome of surgical procedures and pre-operative planning.

The invention may be better understood with reference to the accompanying examples, which are intended for purposes of illustration only and should not be construed as in any sense limiting the scope of the present invention as defined in the claims appended hereto.

Example 1

In order to demonstrate the functionality of the imaging system and methods, the surface segmentation method and two prior art approaches were applied to a single set of brain images acquired by 3D CT angiography for comparison. The results of the reconstruction of the surface with three different models are shown in FIG. 3. Models based on equations A and B below are illustrative of what is known in the art.

The set of acquired images that was used in this example had 512×512 in-plane spatial resolutions with each voxel size approximately 0.125 mm³. Sub-images of size 54×37 were extracted for the aneurysm from the entire set of brain images. Rows 1-3 starting from the top of FIG. 3 shows the results of models (A), (B) and the present invention respectively. For the visually best results, parameters are β=1 for (A), (μ, β)=(500, 0.05) for (B) and (μ, β)=(2700, 0.05) for the methods of the present invention. In each row, the five figures are results at iteration=0, 100, 500, 1000 and 2000 respectively. The results have been highlighted for clarity.

The first model (A) known in the art is considered for comparison is based on the following:

$$\frac{\partial \phi}{\partial t} = |\nabla \phi| \left( \nabla d \cdot \frac{\nabla \phi}{|\nabla \phi|} + d\nabla \cdot \frac{\nabla \phi}{|\nabla \phi|} - \alpha H(\psi) + \beta \nabla \cdot \frac{\nabla \phi}{|\nabla \phi|} \right)$$

where ψ is the signed distance function obtained from a given image whose zero level set represents the boundaries of the objects in the image, and d=|ψ| is the corresponding unsigned distance function. The symbol ∇ is the gradient operator. The energy term αH(ψ) ensures that the model will capture only the inner contour, instead of the outer one. The results are shown in the top row of FIG. 3.

The second model (B) used for comparison is based on the following:

$$\frac{\partial \phi}{\partial t} = |\nabla \phi| \left( \begin{array}{c} \nabla [(1 + \mu c_{a,b} \kappa^+(\psi))d] \cdot \frac{\nabla \phi}{|\nabla \phi|} + [(1 + \mu c_{a,b} \kappa^+(\psi))d] \nabla \cdot \frac{\nabla \phi}{|\nabla \phi|} \\ -\alpha H(\psi) + \beta \nabla \cdot \frac{\nabla \phi}{|\nabla \phi|} \end{array} \right)$$

where μ value is a constant, $c_{a,b}$ is a restriction function and represents the positive part of the curvature. Although this model has been reported to have had some success with 2D images, direct application to capturing 3D surface has not been satisfactory.

Model (B) was developed to improve the illusory contours at corners and the results are shown in the second row of FIG. 3. This model provided some improvement at the tip of the aneurysm in comparison with the model (A); however, it still cannot capture the entire tip which is a very important medical feature.

As illustrated in the third row of FIG. 3, the results of the surface capturing model of the present invention was able to capture the entire aneurysm. One of the reasons for the significant improvement over model A and model B is that modification is made directly to the force field factor that guides the movement of to the zero level set of φ towards the part of the surface that has high Gaussian curvature.

Example 2

In order to further demonstrate the functionality of the imaging system and methods, the surface segmentation method of the present invention was applied to images of ten different brain aneurysms.

Brain aneurysms are typically classified as narrow-neck aneurysms or wide-neck aneurysms by their dome/neck ratios. A narrow-neck aneurysm is defined as having a dome/neck ratio more than 1.5; otherwise, it is considered to be a wide-neck aneurysm. The consistency and robustness of the method was tested on both narrow-neck and wide-neck types of aneurysm images.

Throughout the numerical experiments, parameters $\mu$, $\alpha$ and $\beta$ are taken as $\alpha=0.5$, $\beta=0.001$, and $\mu=2/\text{mean}(\kappa^+(\psi))$. Only the stopping criteria are different depending on whether the aneurysm is classified as narrow-neck or wide-neck. Numerical results show that this choice of parameters and stopping criteria gives consistently good results. All the numerical experiments were performed using MATLAB on a Windows Laptop (Duo processor, 2.0 GHz CPU and 2 GB RAM). It took approximately one minute to capture an aneurysm with volume 100 mm$^3$, and an additional one minute for every 100 mm$^3$ increase in the target size.

Narrow-Necked Aneurysms.

Figure 4A:
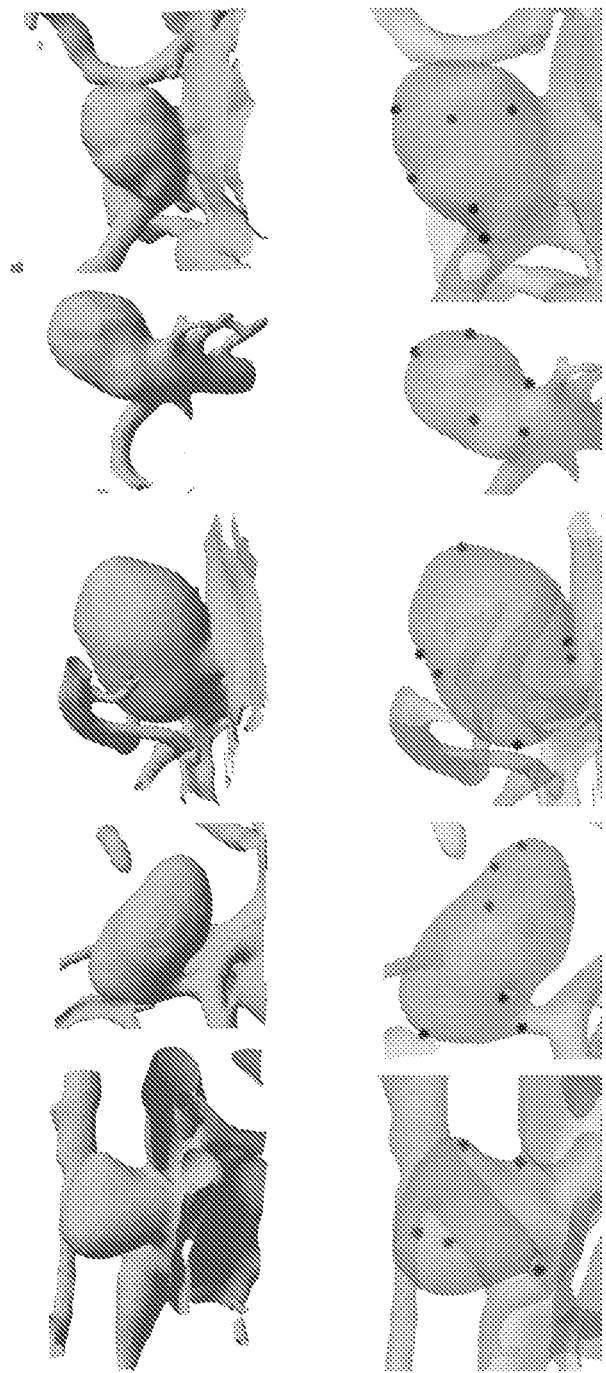
FIG. 4A and FIG. 4B is a set of reconstructions of the application of the invention on five narrow-necked aneurysms.
Figure 4B:
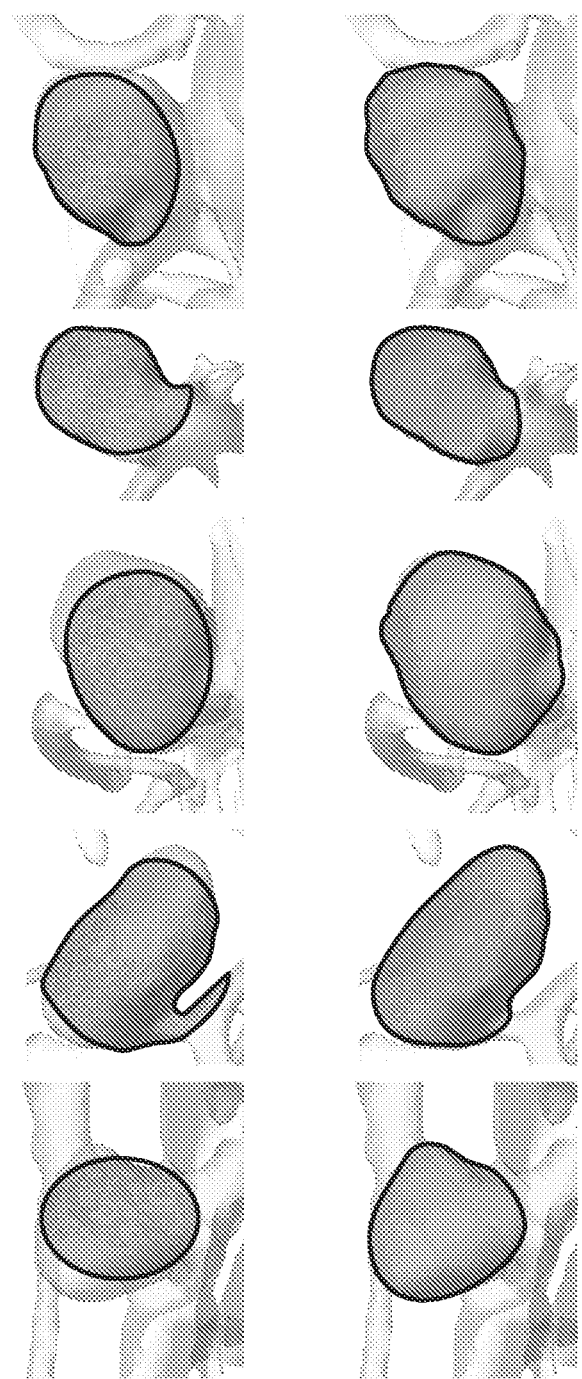

The model was tested on the data of five narrow-neck aneurysms. The reconstructed surfaces from 3D images were acquired for analysis. The computations were initialized and the methods applied with the following stopping criteria for narrow-necked aneurysms:

$$\frac{\|\phi^{n+1} - \phi^n\|_2}{\|\phi^n\|_2} < \text{tolerance}$$

where n is the iteration number which comes from the discretization of time variable t. The bottom row of FIG. 4B shows the numerical results of aneurysm capturing for the five subjects. The top row of FIG. 4A shows the surfaces of the set of narrow-necked aneurysms. The second row of FIG. 4A shows the sets of points given by users. The top row of FIG. 4B is the corresponding initial surfaces. The bottom row of FIG. 4B is the corresponding final captured surfaces. The surfaces are shown with close-up views. The volumes of the aneurysms captured are 213.527 mm$^3$, 520.196 mm$^3$, 602.7 mm$^3$, 319.296 mm$^3$ and 516.399 mm$^3$ respectively from left to right in FIG. 4B.

The robustness of the numerical solutions was also tested by randomly choosing 6 different sets of initial points on one of five aneurysms in FIG. 4A, which generated 6 different initial surfaces. The final results from the 6 different initializations were found to be nearly identical to each other.

Wide-Necked Aneurysms.

For wide-neck aneurysms, the following stopping criteria based on the special geometry of wide-neck aneurysms was adopted:

$$\frac{\|\phi^{n+1} - \phi^n\|_2}{\|\phi^n - \phi^{n+1}\|_2} \approx 1$$

The use of this equation means that the computation stops whenever the change of $\phi^n$ picks up some constant pace. The methods were tested with the above stopping criteria on the data for five different wide-neck aneurysms.

Figure 5A:
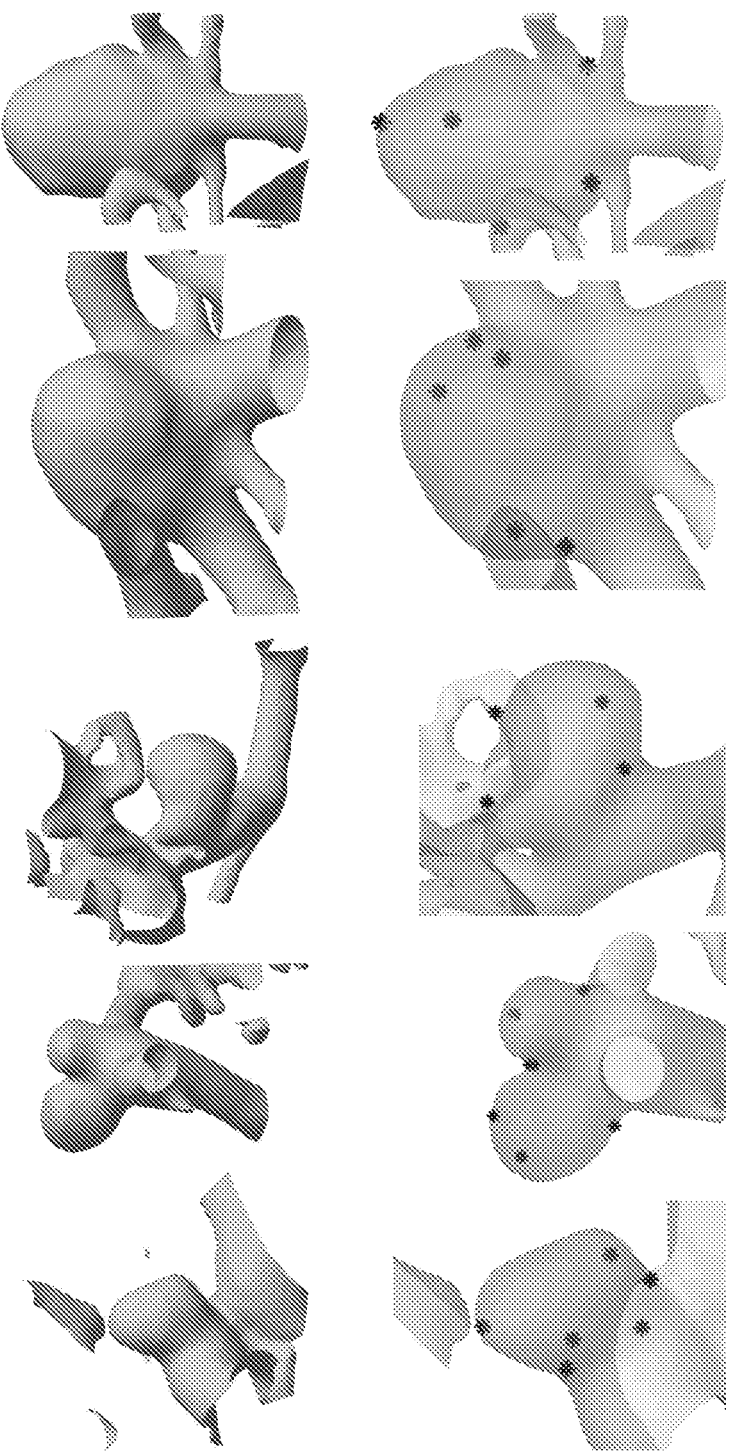
FIG. 5A and FIG. 5B is a set of reconstructions of the application of the invention on five wide-necked aneurysms.
Figure 5B:
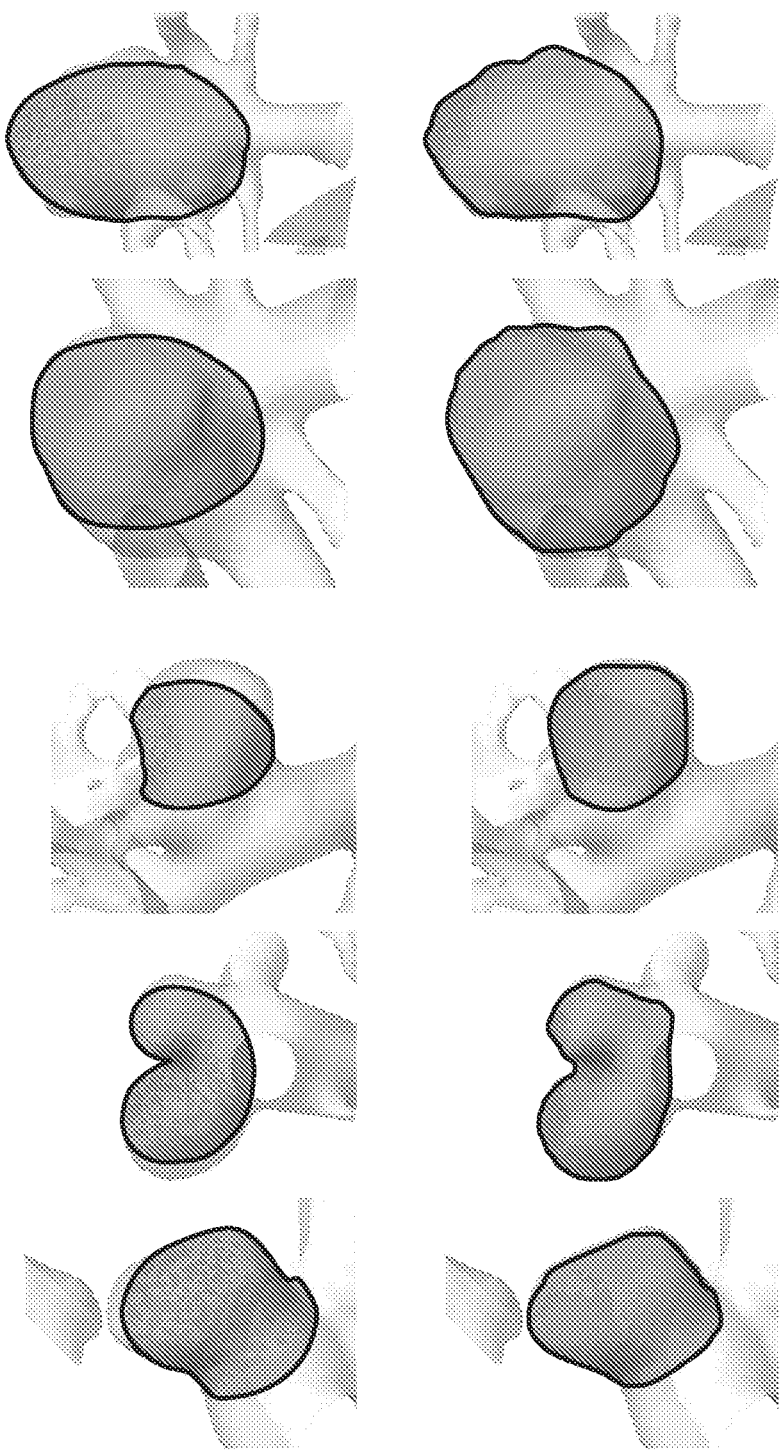

The reconstructed surfaces from 3D images of the wide necked aneurysms are shown on the top row of FIG. 5A. The second row of FIG. 5A shows the sets of points that were given by users. The top row of FIG. 5B is the corresponding initial surfaces. The bottom row of FIG. 5B is the corresponding final captured surfaces. The surfaces in the rows of FIG. 5A and FIG. 5B are shown with close-up views. The volumes of the aneurysms captured are 78.767 mm$^3$, 95.823 mm$^3$, 117.355 mm$^3$, 300.493 mm$^3$ and 748.23 mm$^3$ respectively from left to right of FIG. 5B.

To test the robustness of the methods with wide-necked aneurysms, six (6) different sets of initial points on one of the five aneurysms that were randomly chosen were used and generated 6 different initial surfaces. The final results from the 6 different initializations were also shown to be nearly identical.

It can be seen that the methods of the present invention can quantify the volume and other geometries of brain aneurysms and the associations with aneurysmal growth and rupture. The numerical results showed that the final surface captured the entire target region and allowed the computation of the volume and curvatures of the aneurysms for clinical studies. Although the methods were applied to aneurysms as an illustration, it will be understood that the methods can be applied to many different diagnostic evaluations or circumstances.

From the foregoing description it will be appreciated that the present invention pertains generally to volumetric image analysis and processing methods and devices. Using the present invention, it is possible to obtain geometrical information from multi-dimensional (3D or more) images. As long as an object can be reconstructed as a 3D object, regardless of the source of the images, the invention can be used to segment the target (in 3D) from the rest of the structure and to obtain the target's geometric information, such as volume and curvature.

There exists a need to quantitatively document the geometry of objects and anatomical structures to assist medical clinical evaluation. The invention can segment and compute the geometry of aneurysms, tumors, thromboses, inflammations, foreign objects, organs and any other structures which can be identified in images and reconstructed into 3D objects. Other medical applications in addition to clinical evaluation also include tools for virtual surgery or surgical planning, such as estimation of the volume which will be surgically removed or the volume for surgical filling or research tools to quantitatively obtain the 3D geometry and volume of targets of interest such as individual cells or cell compartments.

As a general method of obtaining geometrical information from irregular, 3D structures, the invention could additionally be extremely useful in the following applications, for example:

(1) Segmentation and computation of geometry and volume from microscopic images to analyze 3D objects, such as individual cells or other related structures.

(2) Analysis of geological images, such as calculation of underground volumes of lava or oil.

(3) Quantification of other objects with irregular shapes such as fire or smoke, or analysis of images captured by satellite.

(4) Extracting regions from general surfaces used for computer graphics.

It is believed that the present invention is superior to existing technologies because it is faster, more accurate, and needs less human interaction. Currently, methods to evaluate 3D volume are limited. A method to evaluate the volume from volumetric images in a timely fashion such as for use in medical clinical evaluation is not available. Existing technologies include (1) manually segmenting the target from either 2D image or 3D mesh followed by a mesh calculation to estimate the volume, and (2) deforming a sphere or ellipse shape to fill the target, and then using the volume of the sphere/ellipse to represent the volume of the target. Both methods are labor intensive and time consuming, and cannot produce accurate results for irregular shaped objects.

In contrast, the present invention can calculate volume and geometry (e.g. curvature) of irregular 3D objects with minimal human interaction. Users need only specify a few points on the surface to initiate the process and the computations are carried out automatically by the apparatus. We have demonstrated its utility to compute the volume and curvature from 3D clinical images, taking a laptop computer approximately one minute after the user has selected points to indicate the target. Experiments have also demonstrated the robustness of the invention, i.e., when different point sets were initially chosen, the invention yielded results with very little variation, which important for high precision volumetric analysis.

It will also be appreciated that a key aspect of the invention is the newly developed 3D surface processing methodology; namely, the modified illusory surface. This methodology uses only a few input points which roughly indicate the area of interest, and computes the volume or geometry (e.g. curvature) of the target (a 3D irregularly shaped region).

By way of example, and not of limitation, our inventive modified illusory surface approach employs two major elements which ensure that our invention functions well:

(1) An amplification factor $A(\psi)$ is used which effectively extracts regions of the surface with high curvature.

(2) The characteristics of the geometry, such as curvature, are used as the segmentation criteria to automatically separate the structure. For example, the Gaussian curvature is used instead of mean curvature as the segmentation criteria for a brain aneurysm. This is beneficial because the regions of interest (the aneurysm) have high Gaussian curvatures while the vessel regions have low Gaussian curvatures. The mean curvatures, however, will not discriminate the aneurysm and the vessel because both of them have high and comparable mean curvatures. The numerical results using mean curvatures will include part of the vessel regions, while using Gaussian curvatures, the extracted surface only includes the aneurysm regions.

In one beneficial embodiment of the invention, the target of interest is indicated. However, this is an optional step that defines the initial calculation points (to start the computation). One may not need to indicate the target if the target can be identified through its own specific properties, e.g., the image intensity or its common location.

In one beneficial embodiment, the modified illusory surface model (adjusting the parameters as needed for the particular type of object being analyzed) to obtain the volume and surface of the target; that is, the relation:

$$\frac{\partial \phi}{\partial t} = |\nabla \phi| \left( A(\psi) \nabla d \cdot \frac{\nabla \phi}{|\nabla \phi|} + d \nabla \cdot \frac{\nabla \phi}{|\nabla \phi|} - \alpha H(\psi) + \beta \nabla \cdot \frac{\nabla \phi}{|\nabla \phi|} \right)$$

However, the factor $A(\psi)$ can be changed to some other factor that can enhance the force field $\nabla d$ at the regions with sharp features, e.g. a sharp tip. Additionally, the Gaussian curvature could be replaced by other curvatures or geometrical characteristics that can discriminate the regions of interest. In other words, the above relation could be written into the following more general form:

$$\frac{\partial \phi}{\partial t} = \vec{v}(\psi)|\nabla \phi| + r(\phi, \psi)|\nabla \phi|$$

where $\vec{v}(\psi)$ is the force field that pushes the zero level set of $\phi$ towards regions of interest (specified by the zero level set of $\psi$), e.g., as does the $$A(\psi) \nabla d \cdot \frac{\nabla \phi}{|\nabla \phi|} - \alpha H(\psi)$$

term in the previous relation, and where the function $r(\phi, \psi)$ controls the regularity of the zero level set of $\phi$, e.g., as does the $$(d + \beta) \nabla \cdot \frac{\nabla \phi}{|\nabla \phi|}$$

term in the previous relation. Different forms of $\vec{v}(\psi)$ and $r(\phi, \psi)$ can be chosen according to different types of surfaces and applications.

The present invention provides for improvement of 3D surface reconstruction, for example better ways to de-noise images or improvements in image resolution, will provide additional advantage to the invention. Moreover, combination with physical information can further extend the application of the invention, such as using information on mass or pressure to derive the density of objects or the number of molecules.

The invention may further be enhanced by (1) de-noising the images before the reconstruction or (2) reconstructing the 3D images first and then applying a surface smoothing algorithm to obtain the 3D geometry. Additionally, default parameters for specific diseases or objects can be empirically selected in advice or users can be allowed to adjust parameters to determine the optimal volume estimations.

The can be implemented in various embodiments, which include but are not limited to the following:

1. An apparatus, comprising: (a) a computer; and (b) programming executable on the computer for receiving image data associated with an object and determining a geometric characteristic of the object from the image data according to $$\frac{\partial \phi}{\partial t} = \vec{v}(\psi)|\nabla \phi| + r(\phi, \psi)|\nabla \phi|,$$

where $\vec{v}(\psi)$ is the force field that pushes the zero level set of $\phi$ towards regions of interest (specified by the zero level set of $\psi$), and where the function $r(\phi, \psi)$ controls the regularity of the zero level set of $\phi$.

2. An apparatus according to embodiment 1, wherein said programming carries out the steps of receiving user input of a plurality of points on an image of an object, said points selected by the user to represent a target region of interest.

3. An apparatus according to embodiment 2, wherein said programming carries out the steps of: using said selected points to determine a general shape such as a sphere with a level set function $\phi_S$; and defining $\phi(x,0)=\min\{\phi_S(x), \phi(x)\}$ wherein $\phi(x,0)$ is the intersection of $\phi$ and $\phi$.

4. An apparatus according to embodiment 1, wherein said programming is configured for determining volume, curvature or other geometric quantities of an the object.

5. An apparatus according to embodiment 1: wherein the object is reconstructable as a 3D object; and wherein the programming is configured to segment the target region (in 3D) from surrounding structure and obtain the target's geometric information, such as volume and curvature.

6. An apparatus according to embodiment 1, wherein said object is selected from the group consisting of aneurysms, tumors, thromboses, inflammations, foreign objects, organs, cells, cell compartments, geological objects, objects with irregular shapes such as fire or smoke, and any other structure which can be identified in images and reconstructed into a 3D object.

7. An apparatus according to embodiment 1, wherein said apparatus is a component of a tool for clinical evaluation, virtual surgery, or surgical planning.

8. An apparatus according to embodiment 1, wherein said programming is configured for segmentation and computation of geometry and volume from microscopic images to analyze 3D objects.

9. An apparatus according to embodiment 1, wherein characteristics of the geometry of the object, such as curvature, are used as segmentation criteria to separate the target region from surrounding structure.

10. An apparatus, comprising: (a) a computer; and (b) programming executable on the computer for receiving image data associates with an object and determining a geometric characteristic of the object from the image data according to $$\frac{\partial \phi}{\partial t} = |\nabla \phi| \left( A(\psi) \nabla d \cdot \frac{\nabla \phi}{|\nabla \phi|} + d \nabla \cdot \frac{\nabla \phi}{|\nabla \phi|} - \alpha H(\psi) + \beta \nabla \cdot \frac{\nabla \phi}{|\nabla \phi|} \right)$$

where α is a constant parameter selected such that the term αH(ψ) prevents the zero level set of φ from passing through that of ψ, β is a constant parameter that controls the global smoothness of φ, d=|ψ|, ∇ is the gradient operator, H(ψ) is the Heaviside function, A(ψ)=1+μκ⁺(ψ), μ is a constant parameter controls the amount of force one wishes to apply near the regions with sharp features, and κ⁺(ψ) is the positive part of the Gaussian curvature of ψ.

11. An apparatus according to embodiment 10, wherein said programming carries out the steps of receiving user input of a plurality of points on an image of an object, said points selected by the user to represent a target region of interest.

12. An apparatus according to embodiment 11, wherein said programming carries out the steps of: using said selected points to determine a general shape such as a sphere with a level set function $\phi_S$; and defining wherein φ(x,0) is the intersection of φ and ϕ.

13. An apparatus according to embodiment 10, wherein said programming is configured for determining volume, curvature or other geometric quantities of an the object.

14. An apparatus according to embodiment 10: wherein the object is reconstructable as a 3D object; and wherein the programming is configured to segment the target region (in 3D) from surrounding structure and obtain the target's geometric information, such as volume and curvature.

15. An apparatus according to embodiment 10, wherein said object is selected from the group consisting of aneurysms, tumors, thromboses, inflammations, foreign objects, organs, cells, cell compartments, geological objects, objects with irregular shapes such as fire or smoke, and any other structure which can be identified in images and reconstructed into a 3D object.

16. An apparatus according to embodiment 10, wherein said apparatus is a component of a tool for clinical evaluation, virtual surgery, or surgical planning.

17. An apparatus according to embodiment 10, wherein said programming is configured for segmentation and computation of geometry and volume from microscopic images to analyze 3D objects.

18. An apparatus according to embodiment 10, wherein A(ψ) is an amplification factor which effectively extracts regions of the surface such as regions with high curvature.

19. An apparatus according to embodiment 10, wherein characteristics of the geometry of the object, such as curvature, are used as segmentation criteria to separate the target region from surrounding structure.

20. An apparatus, comprising: (a) a computer; and (b) programming executable on the computer for carrying out steps comprising: (i) receiving user input of a plurality of points on an image of an object, said points selected by the user to represent a target region of interest; (ii) using said selected points to determine a general shape such as a sphere with a level set function $\phi_S$; (iii) defining wherein φ(x,0) is the intersection of φ and ϕ; and (iv) determining a geometric characteristic of the target region of interest according to $$\frac{\partial \phi}{\partial t} = |\nabla \phi| \left( A(\psi) \nabla d \cdot \frac{\nabla \phi}{|\nabla \phi|} + d \nabla \cdot \frac{\nabla \phi}{|\nabla \phi|} - \alpha H(\psi) + \beta \nabla \cdot \frac{\nabla \phi}{|\nabla \phi|} \right),$$

where α is a constant parameter selected such that the term αH(ψ) prevents the zero level set of φ from passing through that of ψ, β is a constant parameter that controls the global smoothness of φ, d=|ψ|, ∇ is the gradient operator, H(ψ) is the Heaviside function, A(ψ)=1+μκ⁺(ψ), μ is a constant parameter controls the amount of force one wishes to apply near the regions with sharp features, and κ⁺(ψ) is the positive part of the Gaussian curvature of ψ.

Embodiments of the present invention may be described with reference to equations, algorithms, and/or flowchart illustrations of methods according to embodiments of the invention. These methods may be implemented using computer program instructions executable on a computer. These methods may also be implemented as computer program products either separately, or as a component of an apparatus or system. In this regard, each equation, algorithm, or block or step of a flowchart, and combinations thereof, may be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the equation (s), algorithm(s), and/or flowchart(s).

Accordingly, the equations, algorithms, and/or flowcharts support combinations of means for performing the specified functions, combinations of steps for performing the specified functions, and computer program instructions, such as embodied in computer-readable program code logic means, for performing the specified functions. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation (s), algorithm(s), and/or block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus, comprising:
   (a) a computer; and
   (b) a computer program product tangibly embodied on a non-transitory computer readable medium, the computer program product comprising instructions for causing the computer to: receive image data ($\psi$) associated with an object and determine a geometric characteristic ($\phi$) of the object from the image data according to $$\frac{\partial \phi}{\partial t} = \vec{v}(\psi)|\nabla \phi| + r(\phi, \psi)|\nabla \phi|$$

where $\vec{v}(\psi)$ is the force field that pushes the zero level set of $\phi$ towards regions of interest (specified by the zero level set of $\psi$), and where the function $r(\phi, \psi)$ controls the regularity of the zero level set of ($\phi$).

2. An apparatus as recited in claim 1, wherein said programming carries out the steps of receiving user input of a plurality of points on an image of an object, said points selected by the user to represent a target region of interest ($\phi$).

3. An apparatus as recited in claim 2, wherein said programming carries out the steps of:
   using said selected points to determine a general shape such as a sphere with a level set function $\phi_S$; and
   defining $\phi(x,0)=\min\{\phi_S(x), \phi(x)\}$ wherein $\phi(x,0)$ is the intersection of $\phi$ and $\phi$.

4. An apparatus as recited in claim 1, wherein said programming is configured for determining volume, curvature or other geometric quantities of an the object.

5. An apparatus as recited in claim 1:
   wherein the object is reconstructable as a 3D object; and
   wherein the programming is configured to segment the target region in three dimensions from surrounding structure and obtain the target's geometric information, such as volume and curvature.

6. An apparatus as recited in claim 1, wherein said object is selected from the group consisting of aneurysms, tumors, thromboses, inflammations, foreign objects, organs, cells, cell compartments, geological objects, objects with irregular shapes such as fire or smoke, and any other structure which can be identified in images and reconstructed into a 3D object.

7. An apparatus as recited in claim 1, wherein said apparatus is a component of a tool for clinical evaluation, virtual surgery, or surgical planning.

8. An apparatus as recited in claim 1, wherein said programming is configured for segmentation and computation of geometry and volume from microscopic images to analyze 3D objects.

9. An apparatus as recited in claim 1, wherein characteristics of the geometry of the object, such as curvature, are used as segmentation criteria to separate the target region from surrounding structure.

10. An apparatus, comprising:
    (a) a computer; and
    (b) a computer program product tangibly embodied on a non-transitory computer readable medium, the computer program product comprising instructions for causing the computer to: receive image data ($\psi$) associated with an object and determine a geometric characteristic ($\phi$) of the object from the image data according to $$\frac{\partial \phi}{\partial t} = |\nabla \phi|\left(A(\psi)\nabla d \cdot \frac{\nabla \phi}{|\nabla \phi|} + d\nabla \cdot \frac{\nabla \phi}{|\nabla \phi|} - \alpha H(\psi) + \beta \nabla \cdot \frac{\nabla \phi}{|\nabla \phi|}\right)$$

where $\alpha$ is a constant parameter selected such that the term $\alpha H(\psi)$ prevents the zero level set of $\phi$ from passing through that of $\psi$, $\beta$ is a constant parameter that controls the global smoothness of $\phi$, $d=|\psi|$, $\nabla$ is the gradient operator, $H(\psi)$ is the Heaviside function, $A(\psi)=1+\mu\kappa^+(\psi)$, $\mu$ is a constant parameter controls the amount of force one wishes to apply near the regions with sharp features, and $\kappa^+(\psi)$ is the positive part of the Gaussian curvature of $\psi$.

11. An apparatus as recited in claim 10, wherein said programming carries out the steps of receiving user input of a plurality of points on an image of an object, said points selected by the user to represent a target region of interest ($\phi$).

12. An apparatus as recited in claim 11, wherein said programming carries out the steps of:
    using said selected points to determine a sphere with a level set function $\phi_S$; and
    defining $\phi(x,0)=\min\{\phi_S(x), \phi(x)\}$ wherein $\phi(x,0)$ is the intersection of $\phi$ and $\phi$.

13. An apparatus as recited in claim 10, wherein said programming is configured for determining volume, curvature or other geometric quantities of an the object.

14. An apparatus as recited in claim 10:

wherein the object is reconstructable as a 3D object; and wherein the programming is configured to segment the target region in three dimensions from surrounding structure and obtain the target's geometric information, such as volume and curvature.

15. An apparatus as recited in claim 10, wherein said object is selected from the group consisting of aneurysms, tumors, thromboses, inflammations, foreign objects, organs, cells, cell compartments, geological objects, objects with irregular shapes such as fire or smoke, and any other structure which can be identified in images and reconstructed into a 3D object.

16. An apparatus as recited in claim 10, wherein said apparatus is a component of a tool for clinical evaluation, virtual surgery, or surgical planning.

17. An apparatus as recited in claim 10, wherein said programming is configured for segmentation and computation of geometry and volume from microscopic images to analyze 3D objects.

18. An apparatus as recited in claim 10, wherein $A(\psi)$ is an amplification factor which effectively extracts regions of the surface such as regions with high curvature.

19. An apparatus as recited in claim 10, wherein characteristics of the geometry of the object, such as curvature, are used as segmentation criteria to separate the target region from surrounding structure.

20. An apparatus, comprising:
(a) a computer; and
(b) a computer program product tangibly embodied on a non-transitory computer readable medium, the computer program product comprising instructions for causing the computer to:
  (i) receive user input of a plurality of points on an image ($\psi$) of an object, said points selected by the user to represent a target region of interest ($\phi$);
  (ii) use said selected points to determine general shape such as a sphere with a level set function $\phi_S$;
  (iii) define $\phi(x,0)=\min\{\phi_S(x),\phi(x)\}$ wherein $\phi(x,0)$ is the intersection of $\phi$ and $\phi$; and
  (iv) determine a geometric characteristic ($\phi$) of the target region of interest according to $$\frac{\partial \phi}{\partial t} = |\nabla \phi|\left(A(\psi)\nabla d \cdot \frac{\nabla \phi}{|\nabla \phi|} + d\nabla \cdot \frac{\nabla \phi}{|\nabla \phi|} - \alpha H(\psi) + \beta \nabla \cdot \frac{\nabla \phi}{|\nabla \phi|}\right)$$

where $\alpha$ is a constant parameter selected such that the term $\alpha H(\psi)$ prevents the zero level set of $\phi$ from passing through that of $\psi$, $\beta$ is a constant parameter that controls the global smoothness of $\phi$, $d=|\psi|$, $\nabla$ is the gradient operator, $H(\psi)$ is the Heaviside function, $A(\psi)=1+\mu\kappa^+(\psi)$, $\mu$ is a constant parameter controls the amount of force one wishes to apply near the regions with sharp features, and $\kappa^+(\psi)$ is the positive part of the Gaussian curvature of $\psi$.

* * * * *